United States Patent
Kuo

(10) Patent No.: US 7,566,399 B2
(45) Date of Patent: Jul. 28, 2009

(54) WATER PURIFIER

(75) Inventor: Yu-San Kuo, Taichung (TW)

(73) Assignee: New Century Membrane Co., Ltd., Taichung (TW)

( * ) Notice: Subject to any disclaimer, the term of this patent is extended or adjusted under 35 U.S.C. 154(b) by 422 days.

(21) Appl. No.: 11/501,025

(22) Filed: Aug. 9, 2006

(65) Prior Publication Data

US 2008/0035551 A1 Feb. 14, 2008

(51) Int. Cl.
  *B01D 63/16* (2006.01)
  *B01D 25/38* (2006.01)
  *B01D 33/00* (2006.01)
(52) U.S. Cl. .................. 210/321.63; 210/483; 210/484; 210/596; 210/497.1; 210/354; 210/357; 210/486
(58) Field of Classification Search .................. None
  See application file for complete search history.

(56) References Cited

U.S. PATENT DOCUMENTS

| | | | | |
|---|---|---|---|---|
| 2,708,521 A | * | 5/1955 | Saloum ...................... 210/282 |
| 2,863,561 A | * | 12/1958 | Just et al. ..................... 210/347 |
| 3,398,833 A | * | 8/1968 | Marks et al. ........... 210/321.84 |
| 3,465,883 A | * | 9/1969 | Jumper ....................... 210/307 |
| 3,516,542 A | * | 6/1970 | Jaume ................... 210/167.04 |
| 4,557,829 A | * | 12/1985 | Fields ........................ 210/132 |
| 4,793,928 A | * | 12/1988 | Tsukamoto et al. ......... 210/344 |
| 4,902,420 A | * | 2/1990 | Pall et al. ..................... 210/346 |
| 5,112,503 A | * | 5/1992 | Raifman ..................... 210/777 |
| 5,190,651 A | * | 3/1993 | Spencer et al. .............. 210/305 |
| 5,674,393 A | * | 10/1997 | Terhune et al. .............. 210/315 |
| 2008/0073264 A1 | * | 3/2008 | Kuo ...................... 210/321.72 |

* cited by examiner

*Primary Examiner*—Krishnan S Menon
(74) *Attorney, Agent, or Firm*—Banger Shia

(57) ABSTRACT

A water purifier includes a base, an outer casing mounted on the base, a fresh water conduit demountably mounted in the outer casing, a plurality of filtering units demountably mounted on the fresh water conduit and a cover demountably mounted on the outer casing. Each filtering unit includes a membrane bag and multiple supporting members. The membrane bags are sandwiched by the supporting members and are arranged in a cascading manner. Gaps are formed between each pair of adjacent membrane bags so that the filtering bags can be cleaned directly.

12 Claims, 8 Drawing Sheets

US 7,566,399 B2

WATER PURIFIER

BACKGROUND

1. Field of Invention

The present invention relates to a water purifier. More particularly, the present invention relates to a water purifier with demountable filtering membrane bags.

2. Description of Related Art

Tap water is piped to homes and is added with chlorine to obtain sterile water. However, pipes may be damaged or worn out after long-term use so that water in the pipes is easily contaminated. Therefore, water purifiers have been developed in various types and are popular in homes to purify the piped water before drinking. A water purifier in accordance with prior art comprises a casing, a base, a filtering core, a cover and a check valve. The casing is attached to the base. The casing has an opening through which the filtering core can be demountably mounted in the casing. The cover is attached to the casing to cover the opening of the casing and has an inlet and an outlet. The check valve is mounted to the cover. The filtering core has a through hole and is generally made of fiber material, such as cotton yarn or non-woven textile. The fiber material for the filtering core is made in the form of corrugated and folded configuration. The through hole of the filtering core communicates with the outlet in the cover, while the inlet of the cover communicates with the interior of the casing.

Consequently, water will enter the interior of the casing when the check valve is opened and flow through the filtering core because of water pressure. The filtered water enters into the through hole of the filtering core and eventually flows out of the water purifier through the outlet in the cover. However, conventional water purifier simply uses sieve pores of the filtering core to remove suspended particles and microorganisms from water. This kind of conventional water purifier is generally used for primitive purification and the quality of filtered water is not good enough for safe drinking.

Another type of water purifier in accordance with the prior art is to use membrane separation technique to purify water. The filtering membrane is made in the form of hollow fiber, which has been developed by a Japanese company, Mitsubishi or an American company, ZENON. The hollow fibers are bound and put into a tube. Water can be purified when passing through the tubes that hold the hollow fibers. However, the hollow fibers will trap the suspended particles and microorganisms in water and eventually become polluted after long-term use. Water cannot be completely purified in such circumstance if the hollow fibers are not replaced. Therefore, this type of water purifier is only suitable for people who live in areas with high quality water.

Furthermore, the membrane separation technique also includes filtering water by using thin membranes for reverse osmosis (RO) or ultra filtration (UF) applications. The filtering core for RO or UF applications is made in the form of a reel by means of bundling and folding the thin membrane by a spiral-wound method. Pressure is applied to water to force water to pass though the thin film composite (TFC) membrane to generate fresh water and the rest water with pollutants is drained.

However, the filtering cores regardless of using fibers, hollow fibers or thin film membranes for the aforementioned water purifiers need to be periodically cleaned after long-term use. Sometimes, the filtering core is difficult to be completely cleaned if the filtering cores trap too many water pollutants. This is because the filtering core is solid with only pores or is difficult to be disassembled from the purifier. Therefore, special purpose chemical material is needed to clean the used filtering core, or the filtering core has to be replaced by a new one. Therefore, it is not economical and environmentally friendly for conventional water purifier.

Besides, in order to reduce unpleasant flavor of chlorinated water and organic by-product such as trihalomethanes, benzene or vinyl chloride, an active carbon filter is generally used and connected to the inlet of the water purifier. The active carbon filter can trap organic chemicals and chlorine. However, the core of the active carbon filter is also not demountable so high cost will be expected. Besides, connecting to the active carbon requires configuring pipes, which renders the entire water purifier bulky and complex.

Therefore, there is a need to provide an improved water purifier to mitigate or obviate the aforementioned problems.

SUMMARY

An object of the present invention is to provide a water purifier, and the water purifier has multiple filtering units that can be conveniently disassembled from the purifier to clean and flush.

Another object of the present invention is to provide a water purifier with a built-in pre-filtering device, and the entire water purifier is compact.

A water purifier in accordance with the present invention uses multiple membrane bags to filter water. The membrane bags are flat-like and are arranged in a cascading manner. Gaps are formed between each pair of adjacent membrane bags so that the filtering bags can be cleaned directly.

The water purifier comprises a base, an outer casing, a fresh water conduit, multiple membrane bags and a cover. The base has an inlet and an outlet. The outer casing is mounted on the base and has a side wall. The side wall forms a filtering chamber and has an open top end. The filtering chamber communicates with the inlet of the base.

The fresh water conduit is demountably mounted in the filtering chamber of the outer casing and has a conduit wall and a transporting channel defined by the conduit wall. The conduit wall has multiple through holes communicating with the outlet of the base through the transporting channel.

The filtering units are demountably mounted on the fresh water conduit and arranged in a cascading manner. Each of the filtering units comprises a membrane bag with a central hole to hold the fresh water conduit, and multiple supporting members. Each of the supporting members is mounted between a pair of the adjacent membrane bags. The membrane bags are flat-like and are arranged in a cascading manner. Gaps are formed between each pair of adjacent membrane bags so that the filtering bags can be cleaned directly. The cover is demountably mounted on the outer casing to cover the top open end of the outer casing. The filtering units will trap the pollutants, suspended particles, microorganisms etc. when the piped water enters the filter chamber. The clean water flows to the outlet through the transporting channel.

The water purifier may further comprise a pre-filtering device mounted in the outer casing. The pre-filtering device comprises an inner casing, a case assembly and a filtration substance. The inner casing is mounted in the outer casing around the filtering units to surround the filtering units and has a top. The case assembly is demountably mounted on the top of the inner casing. The filtration substance is held by the case assembly. The case assembly comprises a case and a case cover. The case has an inner chamber with at least one compartment arranged in a spiral manner inside the inner chamber. The case cover is mounted on the case to cover the inner chamber.

The inner casing blocks the piped water from the filtering units when the piped water enters the outer casing. The unfiltered water flows over the case cover and eventually enters the inner chamber. The filtration substance in the inner chamber will trap chlorine, microorganisms, pollutants etc. in the unfiltered water when it flows through the inner chamber. Then, the pre-filtered water enters the inner casing and is purified by the filtering units for second purification to obtain high quality clean water.

The water purifier has the membrane bags of the filtering units that are arranged in a cascading manner so that to disassemble the filtering units from the water purifier is convenient and easy. Cleaning the membrane bags is also convenient and easy. The water purifier is economical and environmentally friendly.

The pre-filtering device provides cleaner, higher quality water. The pre-filtering device is built in the outer casing so that the entire size of the water purifier is not significantly large. The water purifier maintains a compact size for convenient installation.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
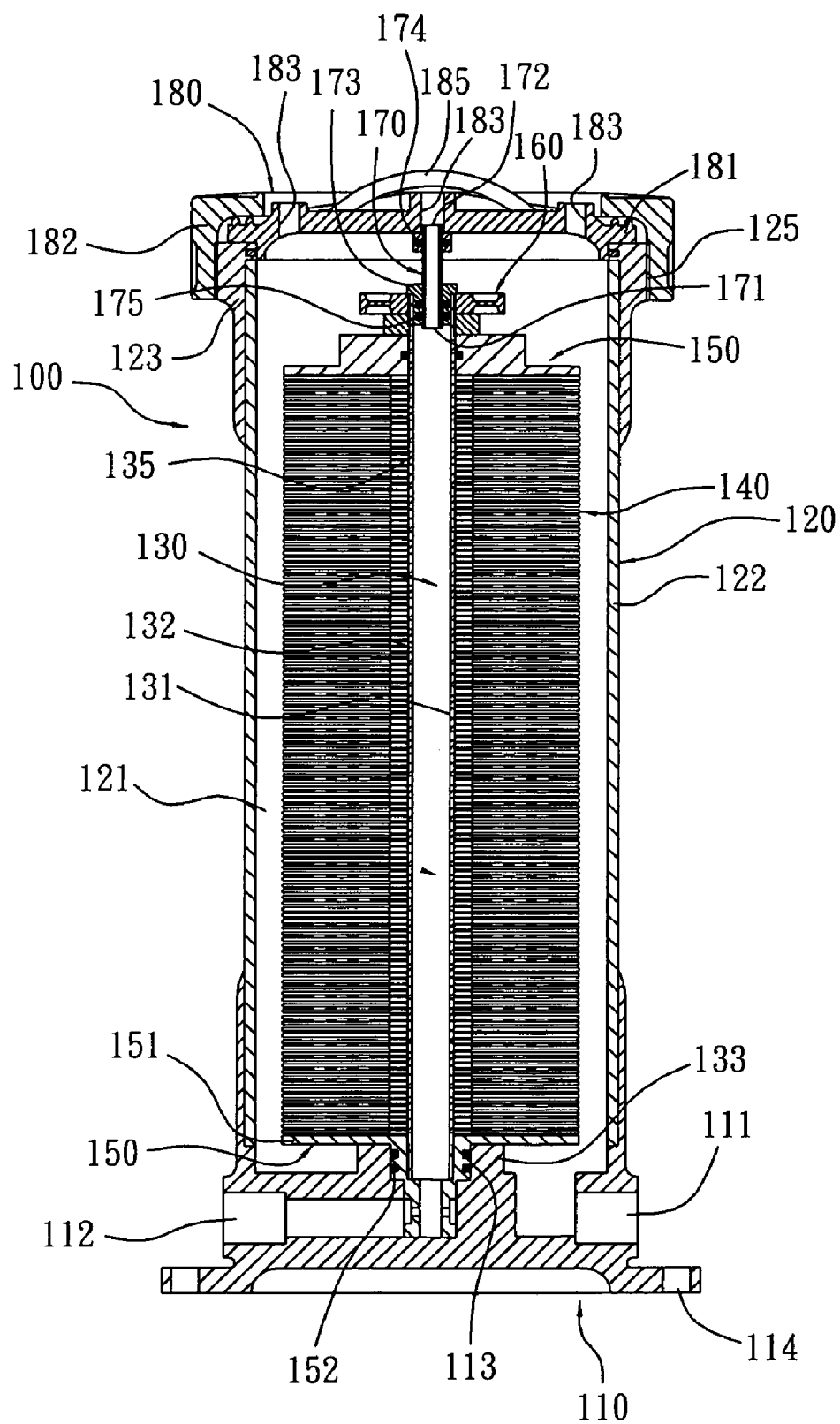
FIG. 1 is a sectional plan view of a first embodiment of a water purifier in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, which is a sectional side view of a water purifier in accordance with the present invention.

A water purifier 100 is adapted to connect to an inlet of a reservoir and comprises a base 110, an outer casing 120, a fresh water conduit 130, multiple filtering units 140, two end plates 150, a release member 160, a vent tube 170 and a cover 180.

The base 110 has a top opening, an inlet 111, an outlet 112, a conduit hole 113, a bottom flange and multiple mounting holes 114. The inlet 111 communicates with the top opening, and connects to the pipes that transport water, where a check valve is connected to the pipes to control the flow of water entering the inlet 111. The mounting holes 114 are defined through the bottom flange for mounting the water purifier on an object, such as the ground. The conduit hole 113 is defined inside the top opening and communicates with the outlet 112.

Figure 2:
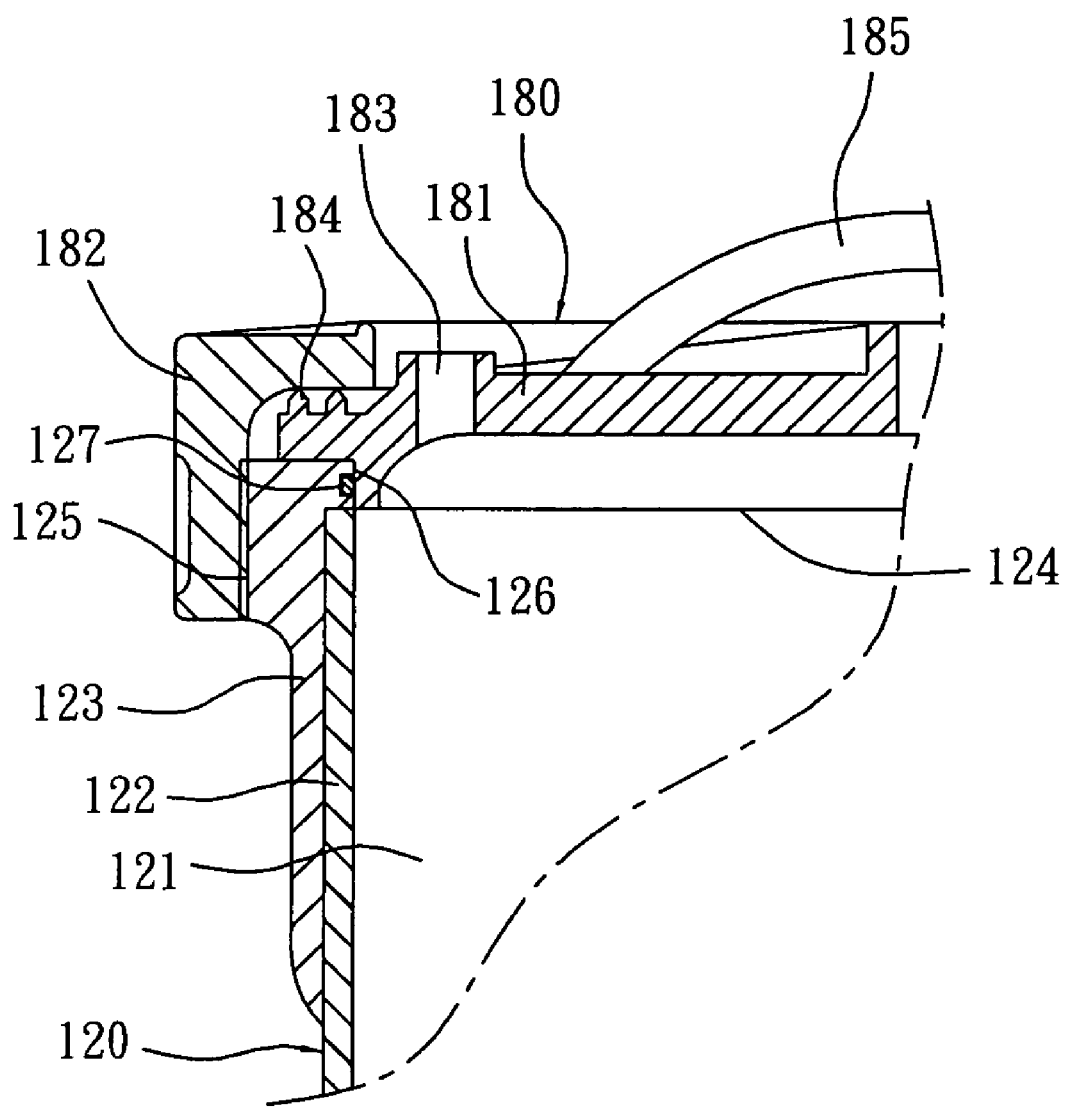
FIG. 2 is an enlarged, sectional plan view of a portion of the water purifier in FIG. 1.

With reference to FIG. 2, the outer casing 120 is hollow and is mounted on the base 110 and partially held in the top opening. The outer casing 120 comprises a side wall 122, a cover seat 123 and a first sealing member 127. The side wall 122 enclosed to form a filtering chamber 121 is partially held in the top opening of the base 110 and has an open top end 124. The filtering chamber 121 communicates with the inlet 111 of the base 110. The cover seat 123 is mounted on the top open end 124 and has an exterior thread 125 for connecting the cover 180 and a top 126. The sealing member 127 can be an O-ring and is mounted between the top 126 of the cover seat 123 and the cover 180.

Figure 3:
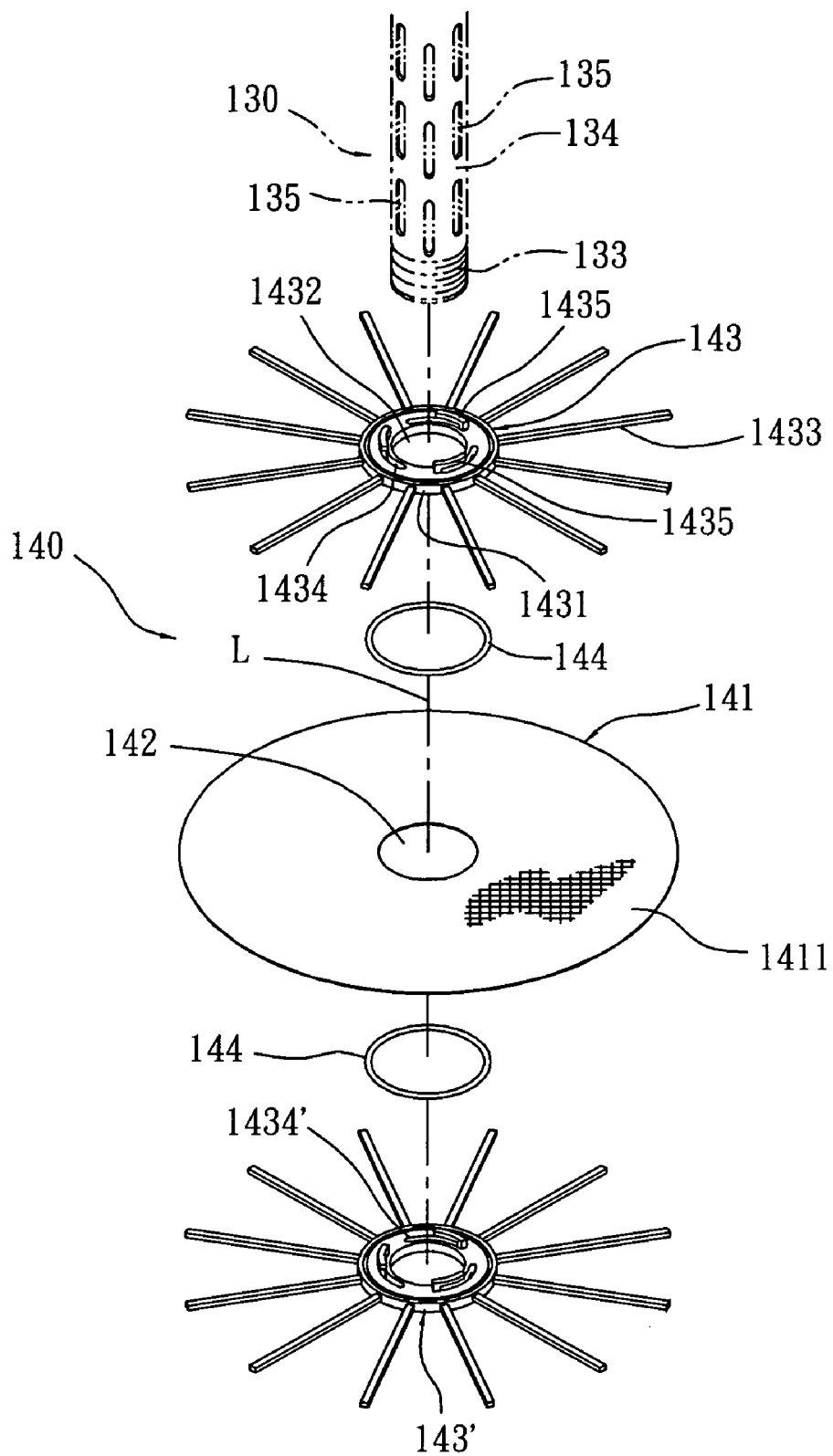
FIG. 3 is an exploded, perspective view of a filtering unit of the water purifier in FIG. 1.

With reference to FIGS. 1 and 3, the fresh water conduit 130 is demountably mounted in the filtering chamber 121 of the outer casing 120 and has a transporting channel 131, an axis L and a conduit wall 132. The conduit wall 132 is enclosed along the axis L to define the transporting channel 131 and has an outer periphery 134, two exterior threads 133 and multiple through holes 135. The exterior threads 133 are respectively defined on the outer periphery 134 near the ends of the fresh water conduit 130. The through holes 135 are defined through the conduit wall 132 and communicate with the transporting channel 131. The exterior thread 133 at the bottom end of the fresh water conduit 130 is screwed into one end plate 150, and then inserted and held in the conduit hole 113 of the base 110. The fresh water conduit 130 is held in the filtering chamber 121 and the transporting channel 131 communicates with the outlet 112.

Figure 4:
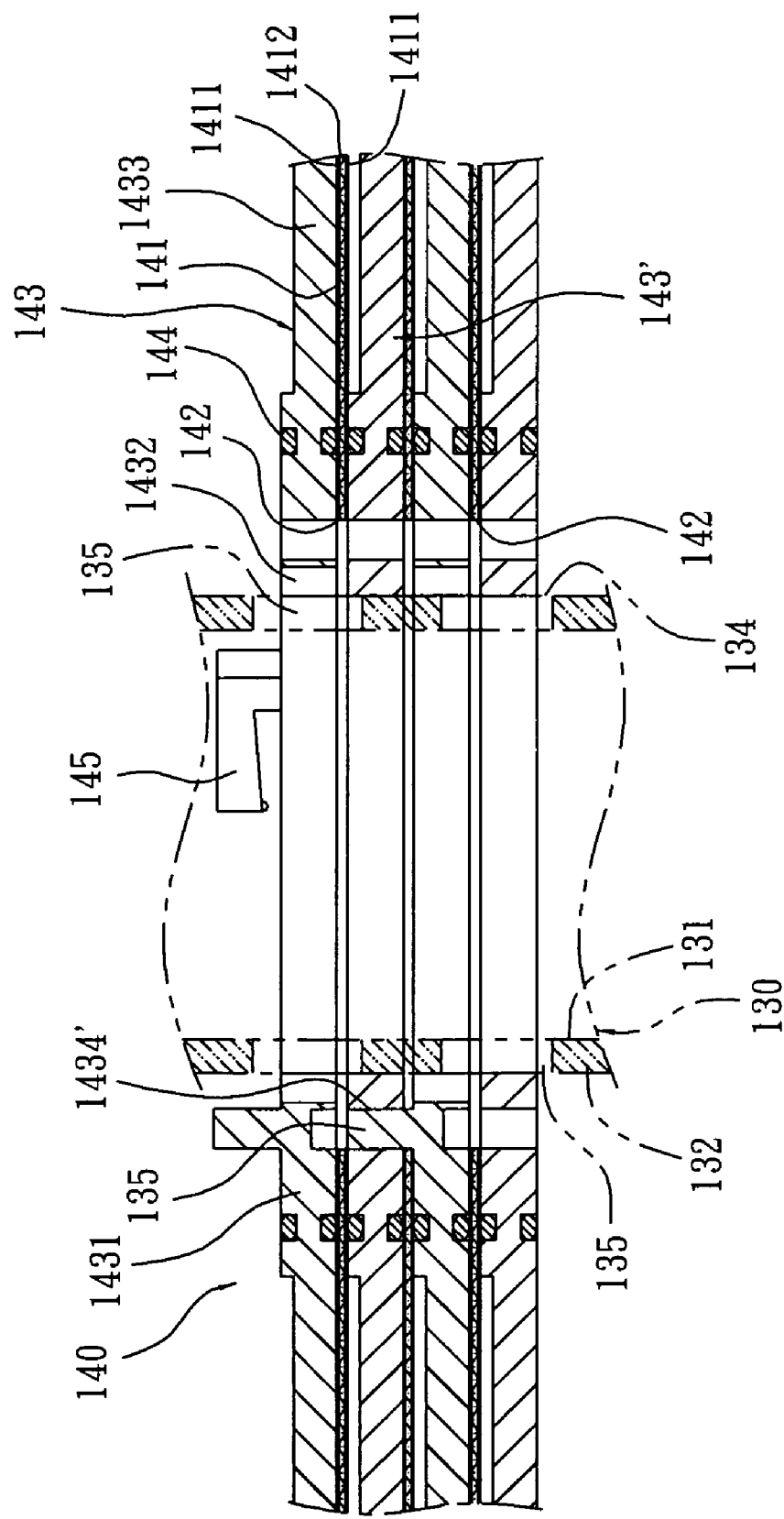
FIG. 4 is an enlarged, sectional plan view in partial of the filtering unit in FIG. 3 when several filtering units are arranged in a cascading manner.

With reference to FIGS. 3 and 4, the filtering units 140 are demountably mounted on the outer periphery 134 of the fresh water conduit 130 and stacked sequentially in a cascading manner. Each filtering unit 140 comprises a membrane bag 141, two supporting members 143, 143' and two second sealing members 144. The membrane bag 141 is flat-like, has a central hole 142 and comprises two thin film membranes 1411 and a supporting net 1412. The thin film membrane 1411 may be made of polyvinylidene fluoride (PVDF) compound and has a sieve pore size of 0.01 millimeter (mm). The thin film membranes 1411 are connected to each other along their edges by means of high frequency soldering, which forms the membrane bag 141. The supporting net 1412 is mounted between the thin film membranes 1411. The membrane bag 141 is mounted between and clamped by the supporting members 143, 143'. The second sealing members 144 are O-rings and are respectively mounted between the supporting members 143, 143' and the membrane bag 141. Gaps are formed between each pair of adjacent membrane bags 141.

Each supporting member 143, 143' comprises a joint ring 1431 and multiple radial ribs 1433. The joint ring 1431 has an axial hole 1432, multiple curved holes 1434, 1434' and multiple curved nubs 1435. The curved holes 1434, 1434' are arranged around the axial hole 1432 of the joint ring 1431 of each supporting member 143, 143'. The curved nubs 1435 are respectively formed adjacent to the curved holes 1434 of the joint ring 1431 of the first supporting member 143 and correspond respectively to the curved holes of the joint ring of the second supporting member adjacent to the first supporting member 143. The curved nubs 1435 have L-shaped profiles and are respectively fitted and held in the corresponding curved holes so that the supporting members 143,143' will clamp and hold the membrane bag 141 in position. Meanwhile, the second sealing members 144 are respectively mounted between the joint rings of the supporting members 143,143' and the membrane bag 141 to prevent unfiltered water entering the fresh water conduit 130.

When the filtering units 140 are assembled on the fresh water conduit 130 in the cascading manner, a gap exists between each pair of adjacent filtering units 140. The gaps allow direct cleaning and flushing the filtering units 140 to remove trapped pollutants when the filtering units 140 are demounted from the outer casing 120.

With reference to FIG. 1, the end plates 150 are respectively screwed with the exterior threads 133 of the fresh water conduit 130 to position the filtering units 140 on the fresh water conduit 130. The end plate 150 has a body 151 with several sealing members 152 to prevent unfiltered water entering the transporting channel 131.

The release member 160 is screwed on the exterior thread 134 at the top end of the fresh water conduit 130 over the end plate 150.

Figure 8:
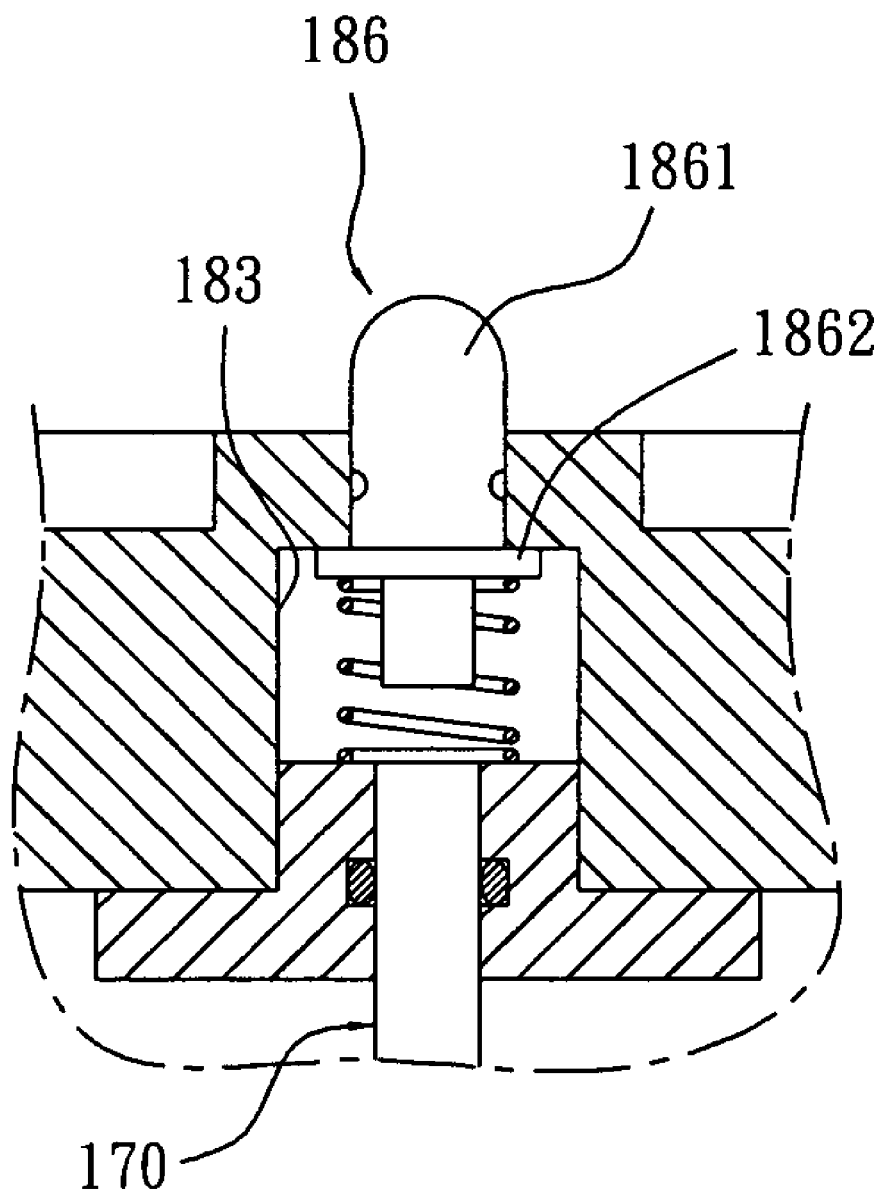
FIG. 8 an enlarged sectional view of a cover body with a check valve.

The vent tube 170 is connected to the top end of the fresh water conduit 130 and has a first end 171 and a second end 172 onto which two plugs 173,174 are respectively mounted. Each plug 173,174 has third sealing members 175 that abut against the vent tube 170 to prevent unfiltered water from entering the transporting channel 131. The first end 171 is held in the top end of the fresh water conduit 130 with the plug 173. The second end 172 is connected the cover 180 with the plug 174 and extended outside the filtering chamber 121 to connect to a check valve 186, as shown in FIG. 8. The vent tube 170 vents air in the transporting channel 131 to the atmosphere when water enters the filtering chamber 121 through the inlet 111, so water can pass through the filtering units 140 and enter the transporting channel 131.

With reference to FIG. 2, the cover 180 is demountably mounted on the cover seat 123 by threads to cover the filtering chamber 121. The cover 180 comprises a cover body 181 and a tightening ring 182. The cover body 181 abuts on the top 126 of the cover seat 123 and has three ports 183, two protrusions 184 and a handle 185. The cover body 181 presses the first sealing member 127 as the tightening ring 182 tightens the cover body 181. Meanwhile, the protrusions 184 are deformed to firmly hold the cover body 181 in position relative to the tightening ring 182 and prevent water leakage. The ports 183 can be respectively used to hold gauges, pressure gauges or valves etc. For example, the check valve 186 that connected to the second end 172 of the vent tube 170 is mounted one port 183 at the center of the cover body 181 as shown in FIG. 8. The check valve 186 comprises a pressing rod 1861 and a valve block 1862 connected to the pressing rod 1861. The valve block 1862 will be simultaneously moved downward to open the port 182 when the pressing rod 1861 is pressed downward to permit venting the air through the vent tube 170 and the port 183. The handle 185 is formed centrally.

When the piped water enters the filtering chamber 121 through the inlet 111, the filtering units 140 will trap the pollutants, microorganisms, suspended particles etc. to purify water after water passes through the membrane bags 140. Clean filtered water enters the transporting channel 131 of the fresh water conduit 130 through the through holes 135, and eventually flows out of the water purifier through the outlet 112 of the base 110. When the membrane bags 140 have trapped lots of pollutants and microorganisms (It can be observed when an amount of outgoing water is decreased.), the check valve connected to the inlet 111 can be closed manually. Then, the rest water in the filtering chamber 121 is drained. The tightening ring 182 can be loosen to uncover the cover 180 and the entire assembly of vent tube 170, end plates 150, fresh water conduit 130 and filtering units 140 can be pulled out from the filtering chamber 121 through the release member 160. If the thin film membranes 1411 of the membrane bags 141 are not seriously contaminated, the membrane bags 141 can be directly washed and flushed to clean the thin film membranes 1411. Since the gaps exist between the membrane bags 141, it is not difficult to clean the membrane bags 141.

If the thin film membranes 1411 of the membrane bags 141 are seriously contaminated, the end plates 150 can be loosen to disassemble the filtering units from the fresh water conduit 130 and the supporting members 1431 from the membrane bags 141. The membrane bags 141 can be conveniently cleaned or replaced with new ones.

Figure 5:
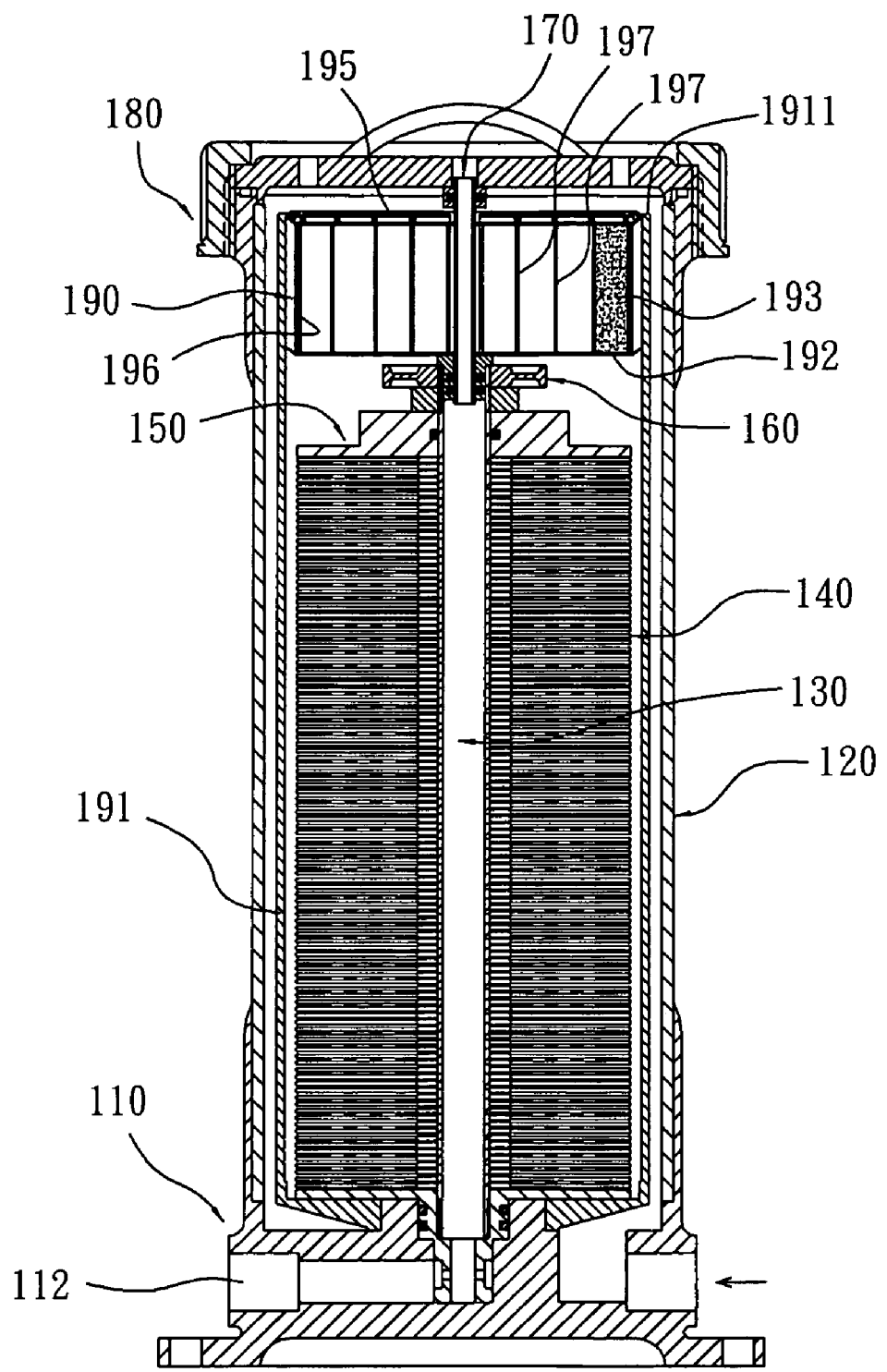
FIG. 5 is a sectional plan view of a second embodiment of a water purifier in accordance with the preset invention.

With reference to FIG. 5, which illustrates a second embodiment of the present invention. The second embodiment further comprises a pre-filtering device 190. Other components, indicating numerals and configurations are the same as those disclosed in the first embodiment. The pre-filtering device 190 is mounted in the outer casing 120 and comprises an inner casing 191, a case assembly 192 and a filtration substance 193. The inner casing 191 is mounted in the outer casing 120 around the filtering units 140 to surround the filtering units 140 except the top 1911. The case assembly 192 is demountably mounted in the top 1911 of the inner casing 191 where the vent tube 170 passes through the case assembly 192. The filtration substance 193 is mounted in the case assembly 192 for filtration.

Figure 6:
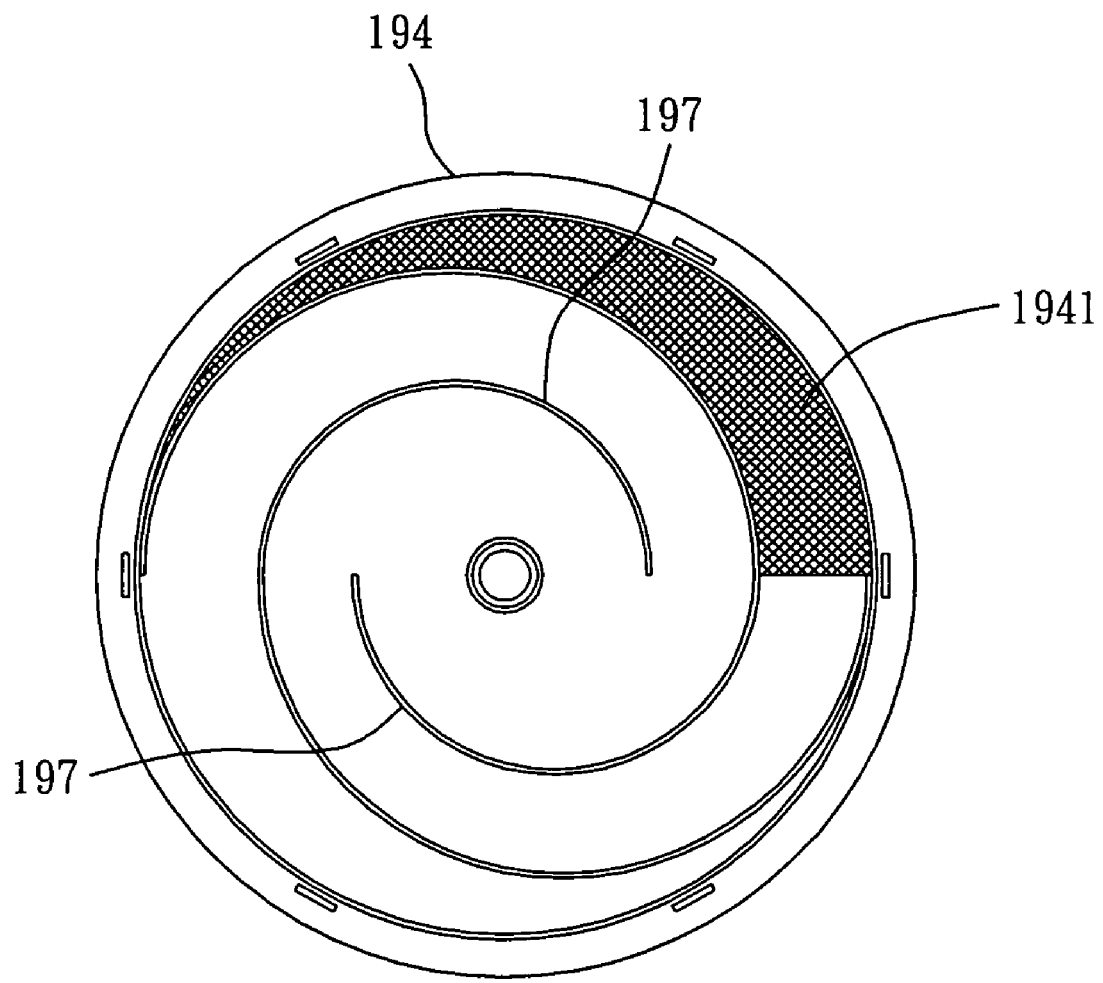
FIG. 6 is a top plan view of a case of a case assembly of a pre-filtering device of the second embodiment in FIG. 5.
Figure 7:
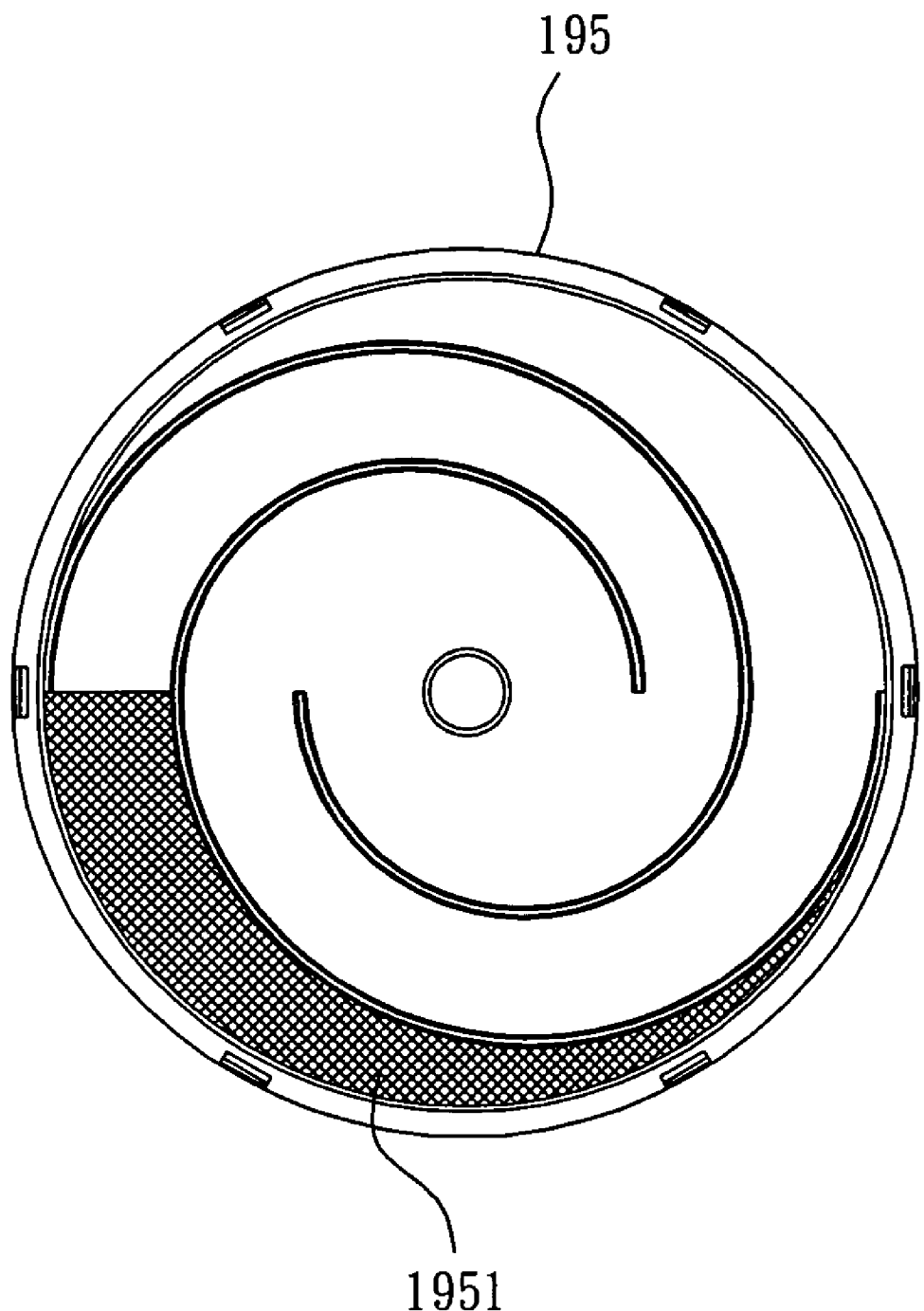
FIG. 7 is a bottom plan view of a case cove of the case assembly in FIG. 6.

With further reference to FIGS. 6 and 7, the case assembly 192 comprises a case 194 and a case cover 195. The case 194 has an inner chamber 196, an outlet net hole 1941, and multiple compartments 197 formed in the inner chamber 196. The compartments 197 are complementarily arranged in the form of a spiral manner to elongate a flow path of water in the case 194. The case cover 195 is mounted to the case 194 to cover the inner chamber 196 and has an inlet net hole 1951. The inlet net hole 1951 and the outlet net hole 1941 are configured opposite to each other to further elongate the flow path of water.

The filtration substance 193 is held in the inner chamber 196 and can use selectively materials, such as ion-exchange resin, mineral substance, active carbon, non-woven textile or a combination of two substances. The mineral substance may be Chinese Maifan stone. In the preferred embodiment, a combination of the active carbon and the ion-exchange resin is selected.

Therefore, the inner casing 191 will block piped water entered from the inlet 111 when piped water enters the outer casing 120. Unfiltered water level between the inner and the outer casings 191,120 is raised until the unfiltered water flows over the case cover 195. Unfiltered water enters the inner chamber 196 through the inlet net hole 1951 and flows along the flow path defined by the spiral compartments 197, and eventually flows out of the case 194 through the outlet net hole 1941. The filtration substance 193 in the inner chamber 196 will trap chlorination, microorganisms, pollutants etc. in unfiltered water when it flows through the inner chamber 196 and soften the water quality. Then, the pre-filtered water enters the inner casing 191 and is purified by the filtering units 140 to obtain high quality clean water.

Likewise, the cover 180 is easy to open for replacing or supplying the filtration substance 193. The entire case assembly 192 can be pulled out from the inner casing 191. The case cover 195 is easy to open for replacing or supplying the filtration substance 193.

The water purifier in accordance with the present invention has some advantages.

First, the water purifier has demountable designs for the filtration substance. Especially, the membrane bags 141 of the filtering units 140 are arranged in a cascading manner so that to disassemble the filtering units 140 is convenient and easy. Cleaning the thin film membranes 1411 of the membrane bags 141 is also convenient and easy when the thin film membranes 1411 are needed to be cleaned. Therefore, the water purifier is economical and environmentally friendly.

Second, since the filtering units 140 are arranged in a cascading manner, the contact area between the thin film membranes 1411 and water has been increased. The filter performance is improved so the amount of outgoing water is raised.

Third, the water purifier 100 can further mount a pre-filtering device 190 to provide cleaner, higher quality water. The pre-filtering device 190 is mounted in the outer casing 120 so that the entire size of the water purifier is not significantly increased. The water purifier maintains a compact size for convenient installation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A water purifier comprising:
   a base having an inlet and an outlet;
   an outer casing mounted on the base and having a side wall, the side wall forming a filtering chamber and having an open top end, the filtering chamber communicating with the inlet of the base;
   a fresh water conduit demountably mounted in the filtering chamber of the outer casing and having a conduit wall and a transporting channel defined by the conduit wall, the conduit wall having multiple through holes communicating with the outlet of the base through the transporting channel;
   multiple filtering units demountably mounted on the fresh water conduit in a cascading manner, each of the filtering units comprising a membrane bag with a central hole to hold the fresh water conduit, and multiple supporting members, each of the supporting members being mounted between a pair of the adjacent membrane bags;
   a cover demountably mounted on the outer casing to cover the top open end of the outer casing; and
   a pre-filtering device comprising:
      an inner casing disposed in the outer casing around the filtering units and formed with a top;
      a case assembly detachably disposed in the top of the inner casing; and
      a filtration substance held with the case assembly.

2. The water purifier as claimed in claim 1, wherein each of the filtering units further comprises two sealing members respectively mounted between the membrane bag and the supporting members of the filtering unit.

3. The water purifier as claimed in claim 1, the membrane bag comprises two thin film membranes and a supporting net mounted between the thin film membranes, two thin film membranes are tightly connected to each other and respectively have sieve pores.

4. The water purifier as claimed in claim 1, wherein each supporting member comprises:
   a joint ring having an axial hole to hold the fresh water conduit;
   multiple curved holes arranged around the axial hole; and
   multiple curved nubs formed respectively adjacent to the curved holes and respectively corresponding to the curved holes of the joint ring of an adjacent supporting member to engage the corresponding holes, each curved nub having an L-shaped profile; and multiple radial ribs attached to the joint ring.

5. The water purifier as claimed in claim 1, the case assembly comprises:
   a case having an inner chamber and an outlet net hole communicated with the inner chamber; and
   a case cover demountably mounted on the case to cover the inner chamber and having an inlet net hole communicated with the inner chamber.

6. The water purifier as claimed in claim 5, wherein the case further comprises at least one compartment arranged in a spiral manner inside the inner chamber.

7. The water purifier as claimed in claim 6, wherein the at least one compartment comprises two compartments complementarily arranged in the spiral manner to elongate a flow path of water in the case, and the inlet net hole and the outlet net hole are configured opposite to each other.

8. The water purifier as claimed in claim 1, wherein the filtration substance is selected from the group consisting of ion-exchange resin, active carbon, Maifan stone and non-woven textile.

9. The water purifier as claimed in claim 1, further comprises a release member mounted on the fresh water conduit.

10. The water purifier as claimed in claim 1, wherein the outer casing further comprises a cover seat mounted on the top open end of the side wall; and the cover comprises a cover body abutting the cover seat, and a tightening ring mounted on the cover seat.

11. The water purifier as claimed in claim 1, further comprises a vent tube with a first end and a second end, the first end connected to the transporting channel of the fresh water conduit and the second end extended out of the cover.

12. The water purifier as claimed in claim 11, wherein a check valve is connected to the second end of the vent tube.

* * * * *